(12) United States Patent
Chuang et al.

(10) Patent No.: US 12,451,912 B2
(45) Date of Patent: Oct. 21, 2025

(54) GENERALIZED DIGITAL COMPENSATOR FOR WIRELESS SYSTEMS

(71) Applicant: Analog Devices International Unlimited Company, Limerick (IE)

(72) Inventors: Kevin Chuang, Belmont, MA (US); Marwen Ben Rejeb, Nepean, CA (US); Ahmed M. R. A. Raslan, Ottawa (CA); Xiao Yu Wang, Watertown, MA (US); Kaustubh Pradeepkumar Mundhada, Kaggadasapura (IN)

(73) Assignee: Analog Devices International Unlimited Company, Limerick (IE)

( * ) Notice: Subject to any disclaimer, the term of this patent is extended or adjusted under 35 U.S.C. 154(b) by 122 days.

(21) Appl. No.: 18/361,697

(22) Filed: Jul. 28, 2023

(65) Prior Publication Data

US 2024/0305322 A1    Sep. 12, 2024

Related U.S. Application Data

(60) Provisional application No. 63/489,690, filed on Mar. 10, 2023.

(51) Int. Cl.
| | | |
|---|---|---|
| *H04B 1/04* | (2006.01) | |
| *H04B 1/00* | (2006.01) | |
| *H04L 27/26* | (2006.01) | |

(52) U.S. Cl.
CPC ......... *H04B 1/0475* (2013.01); *H04B 1/0075* (2013.01); *H04L 27/2614* (2013.01); *H04B 2001/0408* (2013.01)

(58) Field of Classification Search
CPC ................ H04B 1/0475; H04B 1/0075; H04B 2001/0408; H04L 27/2614; H03F 3/19;
(Continued)

(56) References Cited

U.S. PATENT DOCUMENTS

| | | |
|---|---|---|
| 8,903,015 B2 | 12/2014 | Haddad |
| 8,903,336 B2 | 12/2014 | Fonden |

(Continued)

FOREIGN PATENT DOCUMENTS

| | | |
|---|---|---|
| CN | 110533169 A | 12/2019 |
| CN | 118631186 A | 9/2024 |

(Continued)

OTHER PUBLICATIONS

Chu et al., "A Cascaded Memory Polynomial-Neural Network Behavior Model For Digital Predistortion", 2020 IEEE MTT-S International Conference on Numerical Electromagnetic and Multiphysics Modeling and Optimization (NEMO), Dec. 7, 2020 in 3 pages.

(Continued)

*Primary Examiner* — Sung S Ahn
(74) *Attorney, Agent, or Firm* — Knobbe, Martens, Olson & Bear, LLP

(57) ABSTRACT

An adaptable, generalized digital predistortion system that can increase the accuracy of the distortion applied to a power amplifier input signal is disclosed. Further, the digital predistortion system can be implemented using a reduced circuit area by reducing a number of coefficients used by the models applied to generate the distortion compensation signal. Further, the system can implement an improved digital predistortion adaptation engine that can improve one or more of the following metrics of a complete radio frequency (RF) analog front-end radio signal chain: error vector magnitude (EVM), adjacent channel leakage ratio (ACLR), spectrum emission mask (SEM), and power consumption of the circuits and systems. An example of circuits and systems is a radio frequency power amplifier (PA).

20 Claims, 13 Drawing Sheets

(58) Field of Classification Search
CPC ............ H03F 2200/451; H03F 1/3247; H03F 1/3258; H03F 3/245
See application file for complete search history.

(56) References Cited

U.S. PATENT DOCUMENTS

| | | |
|---|---|---|
| 8,982,995 B1 | 3/2015 | Cal |
| 9,172,409 B2 | 10/2015 | Copeland |
| 9,590,567 B2 | 3/2017 | Zhao et al. |
| 10,523,159 B2 | 12/2019 | Megretski et al. |
| 2003/0017813 A1 | 1/2003 | Maruyama |
| 2005/0001684 A1 | 1/2005 | Braithwaite |
| 2005/0157814 A1 | 7/2005 | Cova |
| 2005/0163268 A1 | 7/2005 | McCallister |
| 2012/0069931 A1 | 3/2012 | Gandhi |
| 2013/0241645 A1 | 9/2013 | Bai |
| 2013/0243119 A1 | 9/2013 | Dalipi et al. |
| 2014/0294120 A1* | 10/2014 | Gandhi ................. H03F 1/3241 330/149 |
| 2015/0032788 A1 | 1/2015 | Velazquez et al. |
| 2016/0254787 A1 | 9/2016 | Lee |
| 2016/0308577 A1 | 10/2016 | Molina |
| 2018/0337699 A1 | 11/2018 | Lee |
| 2019/0348956 A1* | 11/2019 | Megretski ............. H03F 1/3247 |
| 2019/0393842 A1 | 12/2019 | Mochida |
| 2022/0036176 A1* | 2/2022 | Megretski ............. G06N 3/063 |
| 2022/0045713 A1 | 2/2022 | Muhammad |

FOREIGN PATENT DOCUMENTS

| | | |
|---|---|---|
| EP | 4429107 A1 | 9/2024 |
| WO | WO 2014/137783 A2 | 9/2014 |
| WO | WO 2018/148822 A1 | 8/2018 |

OTHER PUBLICATIONS

Extended European Search Report in European Patent Application No. 24179809.9, dated Nov. 15, 2024 in 13 pages.
Extended European Search Report dated Jul. 4, 2024 in European Patent Application No. 24157266.8 in 10 pages.
Lopez-Bueno David et al., "Dataset Reduction for Neural Network Based Digital Predistorters under Strong Nonlinearities", 2021 IEEE Topical Conference on RF/Microwave Power Amplifiers for Radio and Wireless Applications (PAWR), IEEE, Jan. 17, 2021, pp. 8-11.
Safari et al., "Spline-Based Model for Digital Predistortion of Wide-Band Signals for High Power Amplifier Linearization", 2007 IEEE/MTT-S International Microwave Symposium, 2007, pp. 1441-1444, doi: 10.1109/MWSYM.2007.380504.
Sankar, "BER with Matched Filtering", DSP LOG, downloaded from https://dsplog.com/2009/05/08/ber-with-matched-filtering/ on Oct. 31, 2024 in 11 pages.
Smith et al., "MUS421/EE367B Lecture 9 Multirate, Polyphase, and Wavelet Filter Banks", Stanford University, Jun. 2, 2020 in 48 pages.

* cited by examiner

GENERALIZED DIGITAL COMPENSATOR FOR WIRELESS SYSTEMS

INCORPORATION BY REFERENCE

This application claims priority to U.S. Provisional Application No. 63/489,690, filed on Mar. 10, 2023, the disclosure of which is hereby incorporated by reference in its entirety for all purposes and made a part of this disclosure. Any and all applications for which a foreign or domestic priority claim is identified in the Application Data Sheet as filed with the present application are hereby incorporated by reference under 37 CFR 1.57.

TECHNICAL FIELD

The present disclosure generally relates to digital compensation for wireless transceivers. Aspects of this disclosure can be implemented in digital pre-distortion (DPD) circuitry. Such circuitry can apply DPD in a transmit path of a transceiver. With DPD of this disclosure, efficient digital models can be extracted to meet high levels of radio performance.

BACKGROUND

Transceivers may be used by wireless devices to transmit or receive radio frequency signals. Often the signal to be transmitted does not have high enough power to reach its target, such as from a base station to a cellular device. Power amplifiers are typically used to increase the signal strength of the signal to be transmitted enabling it to be transmitted greater distances.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a digital predistortion system configured to distort a power amplifier input signal prior to being input to a power amplifier, the digital predistortion system including: A compensator including a plurality of processing circuit blocks, wherein each processing circuit block of the plurality of processing circuit blocks is configured to implement a transformation function to modify a characteristic of an input signal that is input to the compensator, wherein the transformation function is implemented as a set of neurons, and wherein each neuron of the set of neurons includes: a first processor configured to execute a first operation that transforms a complex input signal to a first complex intermediate signal; a second processor configured to execute a second operation that transforms the first complex intermediate signal to a real intermediate signal; a third processor configured to execute a third operation that transforms the real intermediate signal to a second complex intermediate signal; and a multiplier that combines the first complex intermediate signal and the second complex intermediate signal to obtain an output signal, wherein each processing circuit block includes an adder configured to combine the output signal of each neuron from the set of neurons to generate an output of the transformation function.

In some aspects, the techniques described herein relate to a digital predistortion system, wherein each processing circuit block of the plurality of processing circuit blocks is connected in parallel within the compensator.

In some aspects, the techniques described herein relate to a digital predistortion system, wherein, for each neuron of the set of neurons, at least two of the first processor, the second processor, and the third processor of each neuron may be implemented by a single hardware processor.

In some aspects, the techniques described herein relate to a digital predistortion system, wherein each neuron of the set of neurons further includes a fourth processor between the second processor and the third processor, the fourth processor configured to execute a fourth operation that transforms the real intermediate signal to a modified real intermediate signal, and wherein the third operation transforms the real intermediate signal by transforming the modified real intermediate signal to the second complex intermediate signal.

In some aspects, the techniques described herein relate to a digital predistortion system, wherein at least one neuron from the set of neurons includes a plurality of fourth processors cascaded and configured to execute a plurality of fourth operations on the real intermediate signal.

In some aspects, the techniques described herein relate to a digital predistortion system, wherein the real intermediate signal of at least one neuron of the set of neurons is distributed to the fourth processor of a plurality of neurons of the set of neurons.

In some aspects, the techniques described herein relate to a digital predistortion system, wherein at least one of the first operation, the second operation, or the third operation include learnable parameters determined by performing a machine learning process.

In some aspects, the techniques described herein relate to a digital predistortion system, wherein the set of neurons form a neural network.

In some aspects, the techniques described herein relate to a digital predistortion system, wherein at least one of the first operation, the second operation, or the third operation are selected from a set of available operations using a machine learning process.

In some aspects, the techniques described herein relate to a digital predistortion system, further including: a second compensator connected in series with the compensator, the second compensator including a second plurality of processing circuit blocks; and a second adder configured to: sum an output of each processing circuit of the second plurality of processing circuit blocks to obtain a digital predistortion signal; and provide the digital predistortion signal as an input to the power amplifier, wherein the power amplifier is connected in series with the digital predistortion system.

In some aspects, the techniques described herein relate to a digital predistortion system, wherein a combination of at least the compensator and the second compensator are configured to generate a distortion of a power amplifier input signal such that a total system response of a system that includes the power amplifier is linear.

In some aspects, the techniques described herein relate to a digital predistortion system, wherein at least one processing circuit block of the plurality of processing circuit blocks implements a different transformation function than at least one other processing circuit block of the plurality of processing circuit blocks.

In some aspects, the techniques described herein relate to a transceiver radio including: a power amplifier; and a digital predistortion system connected in series with the power amplifier, the digital predistortion system including:

a compensator including a plurality of processing circuit blocks, wherein each processing circuit block of the plurality of processing circuit blocks is configured to implement a transformation function to modify a characteristic of an input signal that is input to the compensator, wherein the transformation function is implemented as a set of neurons, and wherein each neuron of the set of neurons includes: a first processor configured to execute a first operation that transforms a complex input signal to a first complex intermediate signal; a second processor configured to execute a second operation that transforms the first complex intermediate signal to a real intermediate signal; a third processor configured to execute a third operation that transforms the real intermediate signal to a second complex intermediate signal; and a multiplier that combines the first complex intermediate signal and the second complex intermediate signal to obtain an output signal, wherein each processing circuit block includes an adder configured to combine the output signal of each neuron from the set of neurons to generate an output of the transformation function.

In some aspects, the techniques described herein relate to a transceiver radio, further including a crest factor reduction circuit configured to receive a transmit signal and to reduce a peak-to-average power ratio of the transmit signal to obtain a reduced peak-to-average power ratio transmit signal, wherein the reduced peak-to-average power ratio transmit signal is provided as the input signal to the digital predistortion system.

In some aspects, the techniques described herein relate to a transceiver radio, further including a digital predistortion adaptation circuit configured to receive an output of the power amplifier and to configure one or more coefficients of at least one of the first operation, the second operation, or the third operation based at least in part on applying the output of the power amplifier to a machine learning model.

In some aspects, the techniques described herein relate to a transceiver radio, wherein each neuron of the set of neurons further includes a fourth processor between the second processor and the third processor, the fourth processor configured to execute a fourth operation that transforms the real intermediate signal to a modified real intermediate signal, and wherein the third operation transforms the real intermediate signal by transforming the modified real intermediate signal to the second complex intermediate signal.

In some aspects, the techniques described herein relate to a transceiver radio, wherein the real intermediate signal of at least one neuron of the set of neurons is distributed to the fourth processor of a plurality of neurons of the set of neurons.

In some aspects, the techniques described herein relate to a transceiver radio, wherein the digital predistortion system further includes: a second compensator connected in series with the compensator, the second compensator including a second plurality of processing circuit blocks; and a second adder configured to: sum an output of each processing circuit of the second plurality of processing circuit blocks to obtain a digital predistortion signal; and provide the digital predistortion signal as an input to the power amplifier, wherein the power amplifier is connected in series with the digital predistortion system.

In some aspects, the techniques described herein relate to a transceiver radio, wherein a combination of at least the compensator and the second compensator are configured to generate a distortion of a power amplifier input signal such that a total system response of a system that includes the power amplifier is linear.

In some aspects, the techniques described herein relate to a wireless device including: an antenna configured to emit a signal received from a power amplifier; the power amplifier; and a transceiver radio including a digital predistortion system in connected series with the power amplifier, the digital predistortion system including: a compensator including a plurality of processing circuit blocks, wherein each processing circuit block of the plurality of processing circuit blocks is configured to implement a transformation function to modify a characteristic of an input signal that is input to the compensator, wherein the transformation function is implemented as a set of neurons, and wherein each neuron of the set of neurons includes: a first processor configured to execute a first operation that transforms a complex input signal to a first complex intermediate signal; a second processor configured to execute a second operation that transforms the first complex intermediate signal to a real intermediate signal; a third processor configured to execute a third operation that transforms the real intermediate signal to a second complex intermediate signal; and a multiplier that combines the first complex intermediate signal and the second complex intermediate signal to obtain an output signal, wherein each processing circuit block includes an adder configured to combine the output signal of each neuron from the set of neurons to generate an output of the transformation function.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

DETAILED DESCRIPTION OF CERTAIN EMBODIMENTS

Figure 1:
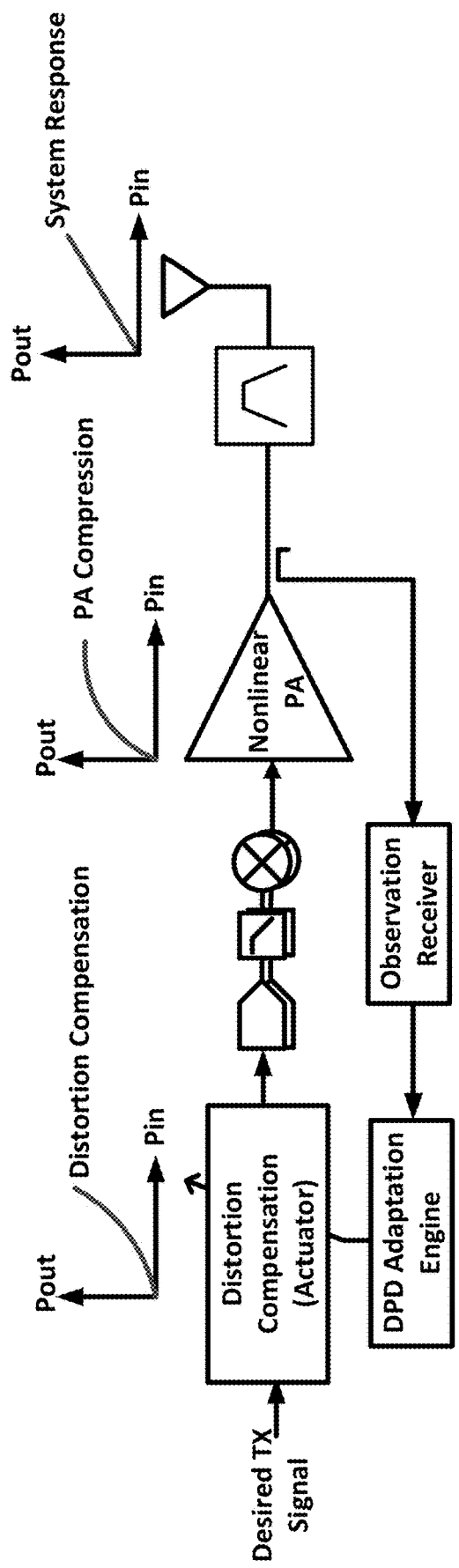
FIG. 1 illustrates an example digital linearization system in accordance with certain embodiments.

The headings provided herein, if any, are for convenience only and do not necessarily affect the scope or meaning of the claimed invention. For the purpose of the present disclosure, the terms mobile devices and wireless devices are used interchangeably.

Introduction

Often new wireless technologies require transmitters to operate more efficiently without compromising the radio frequency performance (e.g., bandwidth and emissions) and implementation area. Further, new wireless technologies can introduce power consumption, weight, and thermal management challenges. In some cases, newer technologies utilize greater bandwidths and larger frequency ranges, which can result in higher power requirements and the introduction of greater nonlinearity in the transmit signal and larger memory effects that existing models are unable to capture. The larger memory effects may mean that signal changes are no captured by the sampling window supported by the amount of coefficients utilized by existing models. Further, it is harder to satisfy the more stringent adjacent channel leakage ratio (ACLR) (or adjacent channel leakage power ratio) and digital predistortion (DPD) requirements with newer wireless technologies. The conventional approaches from literature and prior art tends to lend itself to either saturated performance (aka curse of dimensionality) or impracticality. Increasing the complexity of the model to capture the memory effects and to account for the increased nonlinearity may be untenable. Thus, it is necessary to generate newer models that can balance complexity and performance.

One area where increased efficiency is desired is with respect to the power amplifier and more specifically, the linearity of the power amplifier. Traditional approaches have begun to show limitations. To satisfy newer specifications that have more stringent requirements, a new design methodology and modelling framework is needed that enables extraction or generation of efficient digital models to cope with the ever-increasing level of radio performance requirements. Current amounts of coefficients and/or lookup tables used with traditional models are insufficient. However, it is important to maintain a balance between complexity and performance in introducing newer more capable models.

In some embodiments, the digital baseband model or baseband chip attempts to address the above issues. However, the digital baseband model is often not capable of linearizing the sophisticated high efficiency power amplifier architectures required in newer wireless devices implemented in accordance with newer wireless technologies. Thus, it is desirable to modify the digital predistortion and digital predistortion adaptation within the transceiver to address the above problems. Moreover, it is often the case that the more efficient the model, the more nonlinear and efficient a power amplifier can be configured or utilized by the wireless device. Embodiments disclosed herein present an improved model that may be implemented by the DPD system that reduces nonlinearity while improving efficiency of the power amplifier. In other words, the DPD system of the present disclosure improves efficiency while satisfying the linearity specification of newer wireless communication technologies. Further, embodiments disclosed herein are not limited to a single model, such as a Volterra-based model or generalized memory polynomial (GMP), but can incorporate a plurality of models enabling a more refined or improved DPD system that can more accurately match the nonlinearity of a power amplifier to improve linearization of the radio transceiver and/or the wireless device incorporating the radio transceiver and/or power amplifier. Further, embodiments disclosed herein can implement an improved digital predistortion adaptation engine that can improve one or more of the following metrics of a complete radio frequency (RF) analog front-end radio signal chain: error vector magnitude (EVM), adjacent channel leakage ratio (ACLR), spectrum emission mask (SEM), and power consumption of the circuits and systems. In certain embodiments, the systems disclosed herein relate to improving one or more characteristics of a radio frequency power amplifier (PA)

As illustrated in FIG. 1, a nonlinear power amplifier can be configured to generate a linear output by distorting an input to the power amplifier such that the total system response is linear. Digital predistortion can be used to distort the desired transmit signal such that the output of the power amplifier is linear. The nonlinear distortion compensation generated by the distortion compensation circuit combined with the nonlinear output of the power amplifier can result in a total system response that is linear.

The distortion generated by the digital predistortion system can be based on the output of the power amplifier. Increasing the accuracy of the digital predistortion can be achieved through the use of more complex models that may be used to determine the distortion to apply to the nonlinear power amplifier. However, increasing the complexity of the models can result in greater circuit area and power consumption.

The present disclosure relates to an adaptable, multistate, multi-rate digital predistortion system that can increase the accuracy of the distortion applied to the power amplifier input signal by implementing a plurality of models as part of the digital predistortion system. In other words, the system disclosed herein can reduce the error between the generated distortion signal and the power amplifier output by increasing the flexibility of the models that may be implemented by the digital predistortion system. In some embodiments, the digital predistortion system of the present disclosure may include one or more of the embodiments disclosed in U.S. application Ser. No. 18/332,323, filed on Jun. 9, 2023 and hereby incorporated by reference in its entirety for all purposes and made a part of the present disclosure.

Further, although the DPD system of the present disclosure is described as a pre-distorter for introducing a complementary nonlinearity to compensate for the nonlinearity of a power amplifier in a transmitter, it should be understood that in the general case the embodiments disclosed herein can be used as part of a post-distorter of a receiver to compensate for the nonlinearity of a low noise amplifier of a receiver.

Digital Predistortion System

Figure 2:
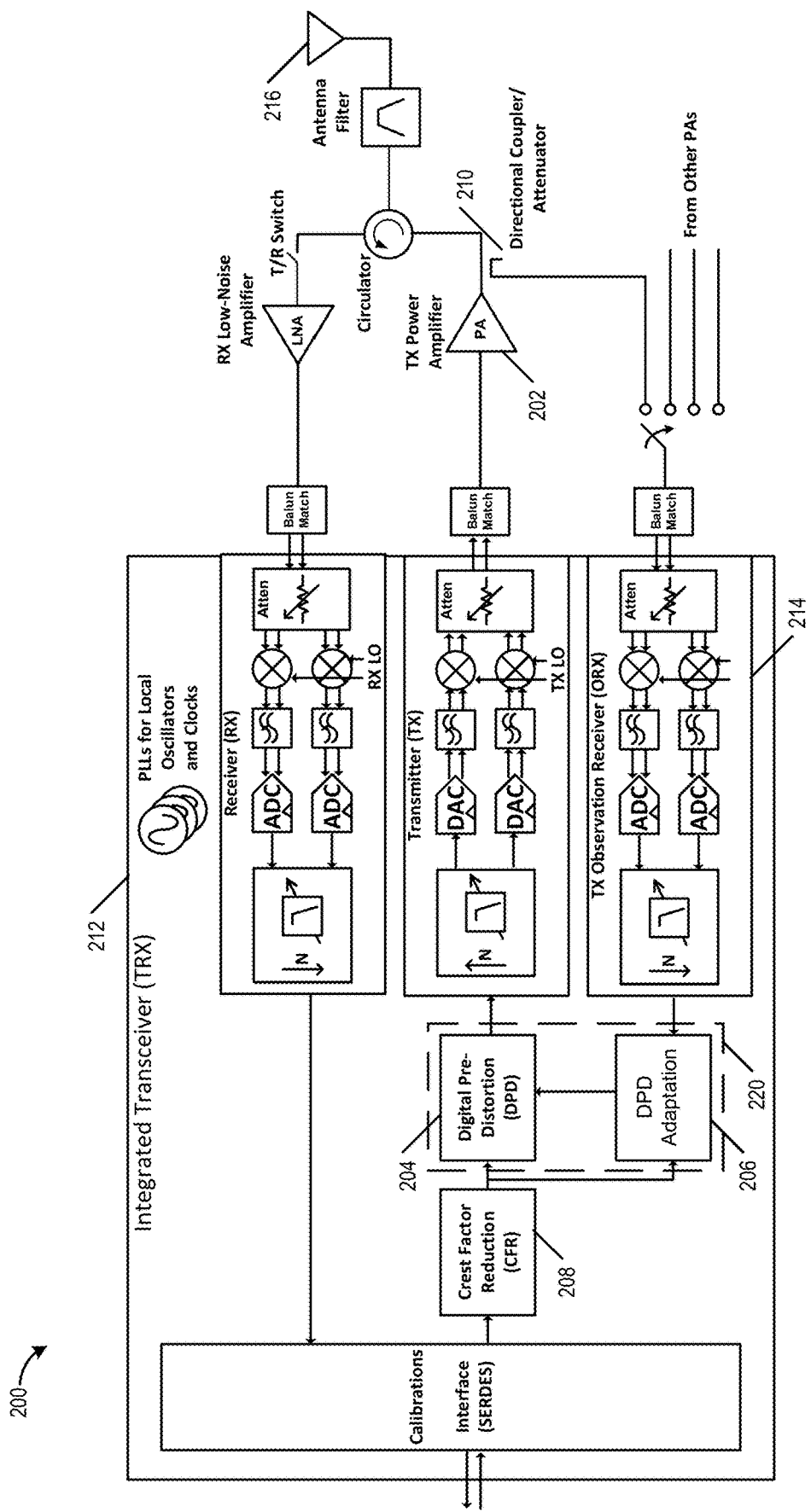
FIG. 2 illustrates a portion of a wireless system that includes a transceiver radio that implements digital predistortion in accordance with certain embodiments.

FIG. 2 illustrates a portion of a wireless system 200 that includes an integrated transceiver or transceiver radio that implements digital predistortion in accordance with certain embodiments. The wireless system 200 may include, among other circuit elements and systems, a transceiver radio 212 (or integrated transceiver), a power amplifier 202, and a coupler 210. The transceiver radio 212 may include a linearization engine 220 that can linearize the signal to be transmitted by the wireless system 200 by introducing a nonlinearity into the signal that is complementary to the nonlinearity introduced by the power amplifier 202. The linearization engine 220 may include a digital predistortion system 204 and a digital predistortion adaptation system 206 (DPD). The digital predistortion system 204 may introduce nonlinearity into a signal received from a crest factor reduction circuit 208 (CFR) for transmission. The digital predistortion adaptation system 206 may be used to configure models implemented or executed by the digital predistortion system 204. The models may be configured in part based on feedback from the power amplifier 202, which may be provided by a transmitter observation receiver 214 to the digital predistortion adaptation system 206.

In some embodiments, the transceiver radio 212 can include the power amplifier 202. In some embodiments, the transceiver radio 212 outputs a signal for transmission that is provided to the power amplifier 202 to increase the signal strength of the signal for emission or to be emitted by the antenna 216. The coupler 210 can be used to provide a power signal or power measurement from the output of the power amplifier 202 to the transmitter observation receiver 214, which can determine the signal output by the power amplifier 202 based on the measured power received from the coupler 210. The output signal may be provided by the transmitter observation receiver 214 to the digital predistortion adaptation system 206. The digital predistortion adaptation system 206, as described in U.S. application Ser. No. 18/332,323 incorporated by reference above, can use the power amplifier 202 output signal to determine one or more coefficient values for configuring one or more models used by the digital predistortion system 204 to determine a distortion or predistortion signal to apply to the transmit signal prior to being provided to the power amplifier 202. Thus, a feedback mechanism can be used to configure the digital predistortion system 204 enabling an improved compensation system for converting the nonlinear power amplifier 202 output into a linear system response for the wireless system 200 or the transceiver radio 212 of the wireless system 200.

The digital predistortion system 204 can be implemented as a series of compensators or compensation circuits. Each of these compensation circuits can implement different functionality, algorithms, models, or transformation functions, including machine learning based models. In some embodiments, the digital predistortion system 204 can be a multistage system that includes a plurality of compensation circuits connected in series. Advantageously, by using a multistage system, the number of coefficients included in the implemented models can be reduced while not increasing the amount of power leaking into adjacent channels. Moreover, in some cases, the adjacent channel leakage ratio may be reduced. The reduction in the number of coefficients may not only increase efficiency while improving performance, but may also reduce circuit area due, for example, to the reduction in the number of supported coefficients necessary to implement the models executed by the compensation circuits.

The digital predistortion system 204 may apply distortion to an input signal corresponding to a signal to be transmitted. The input signal may be received from the crest factor reduction circuit 208. The crest factor reduction circuit 208 may reduce a peak-to-average power ratio (PAPR) of the signal to be transmitted to obtain a reduced PAPR transmit signal. This reduced PAPR transmit signal may be provided as the input to the digital predistortion system 204, which may in turn pre-distort the received signal before it is provided to the power amplifier 202. As illustrated in FIG. 2, the output of the digital predistortion system 204 may be provided to other subsequent circuitry (e.g., a transmitter that includes upsamplers, digital to analog converters, mixers, local oscillators, etc.) before it is provided to the power amplifier 202, which may be a separate circuit or may be included as part of the transmitter. Further, the digital predistortion system 204 may apply the pre-distortion based at least in part on feedback received from the power amplifier 202, which is used by the digital predistortion adaptation system 206 to configure the digital predistortion system 204.

Figure 3:
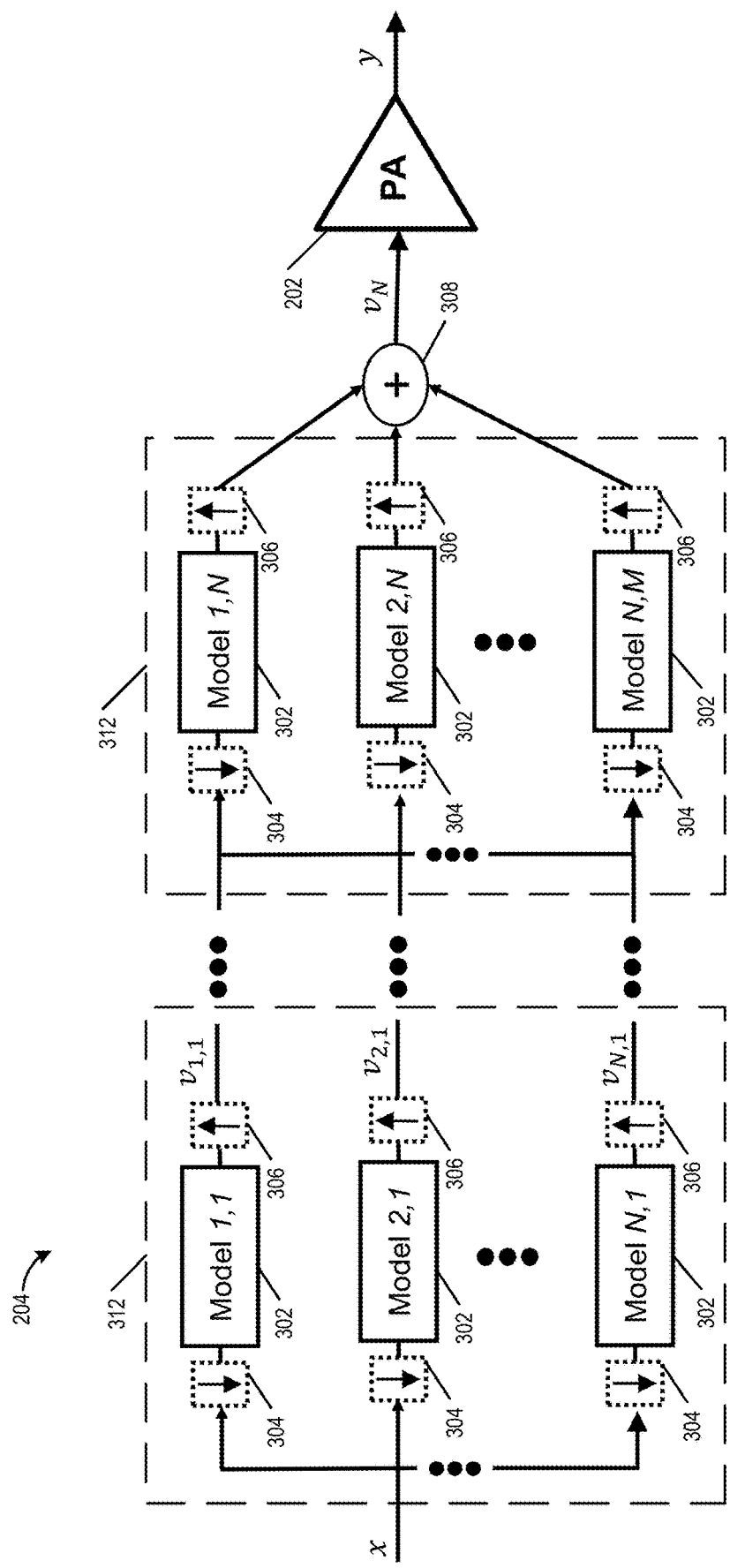
FIG. 3 illustrates an example implementation of a generalized digital compensator system in accordance with certain embodiments.

FIG. 3 illustrates an example implementation of a generalized digital compensator system 204 in accordance with certain embodiments. The digital predistortion system 204 may include a series of compensators 312 that may be cascaded or connected in series. Each of the compensators 312 can implement or execute a series of parallel models (e.g., the models 302). Each of the models 302 may be a type of transformation function or machine learning model that can be used to modify a linearity of an input signal. The models 302 may be the same type or different types of models (e.g., Volterra series, neural networks, generalized memory polynomials, etc.). Further, each model 302 may be preceded by a down sampling circuit 304 and each model 302 may be followed by an upsampling circuit 306. In some cases, the compensators 312 may down sample and/or up sample the signal provided to the model 302 or output by the model 302. In some cases, down sampling or up sampling is not performed by some compensators 312 (or models 302). In such cases, the down sampling circuit 304 or upsampling circuit 306 may be omitted. Alternatively, the down sampling circuit 304 and/or upsampling circuit 306 may remain but may not be used. Thus, in some embodiments, it is possible to dynamically configure the compensators 312 to modify the sample rate of the signal processed by the compensators 312.

The output of each model 302 of the compensator 312 can be provided as an input to a corresponding model 302 in a subsequent compensator 312 within the same signal path. Thus, for example, the output of the model 1,1 can be provided as an input to the model 1,2 (not shown), and the output of the model 1,2 may be provided as an input to the next model and so on and so forth until reaching the model 1,N. The outputs of the models 302 of the last compensator 312 of the digital predistortion system 204 are all at the same sample rate. If the output of one series of models 302 (e.g., model 1,N) is at a different sample rate than the output of another series of models 302 (e.g., model 2,N) the upsampling circuit 306 of the model with the lower sample rate can upsample the output of the model 302 such that all the models generate an output at the same sample rate. The outputs of each of the models 302, which may be after upsampling in certain cases, may be provided to an adder or summing circuit 308 to generate a single signal, which may then be provided to the power amplifier 202, or intermediary circuitry (not shown) prior to the power amplifier 202.

In implementations where the compensators 312 include a plurality of models 302, the models 302 may be connected in parallel within the compensators 312. Each of the models 302 may include any type of algorithm or model that may be used to determine an amount of predistortion to apply to a transmit signal prior to input to the power amplifier 202. Further, the algorithm or model may use an output from the power amplifier 202 to facilitate determining the predistortion to apply to the transmit signal and/or to configure the algorithm or model used to determine the predistortion to apply to the transmit signal. In some cases, the algorithm or model may include a machine learning based model. Some non-limiting examples of models, transformation functions, or mathematical series that may be implemented by the models 302 of the compensators 312 include: Taylor series, Volterra series, piecewise functions, Saleh model, memory polynomial, orthogonal memory polynomial, exponentially shaped memory delay polynomial, envelope memory polynomial, generalized memory polynomial, dynamic deviation reduction, long-term memory model, band-limited model, power-dependent model, dynamic power model, spline-interpolated lookup table, or multi-band model, among others. Further, in some embodiments, the models 302 may include a neural network or other machine learning based model.

Figure 4:
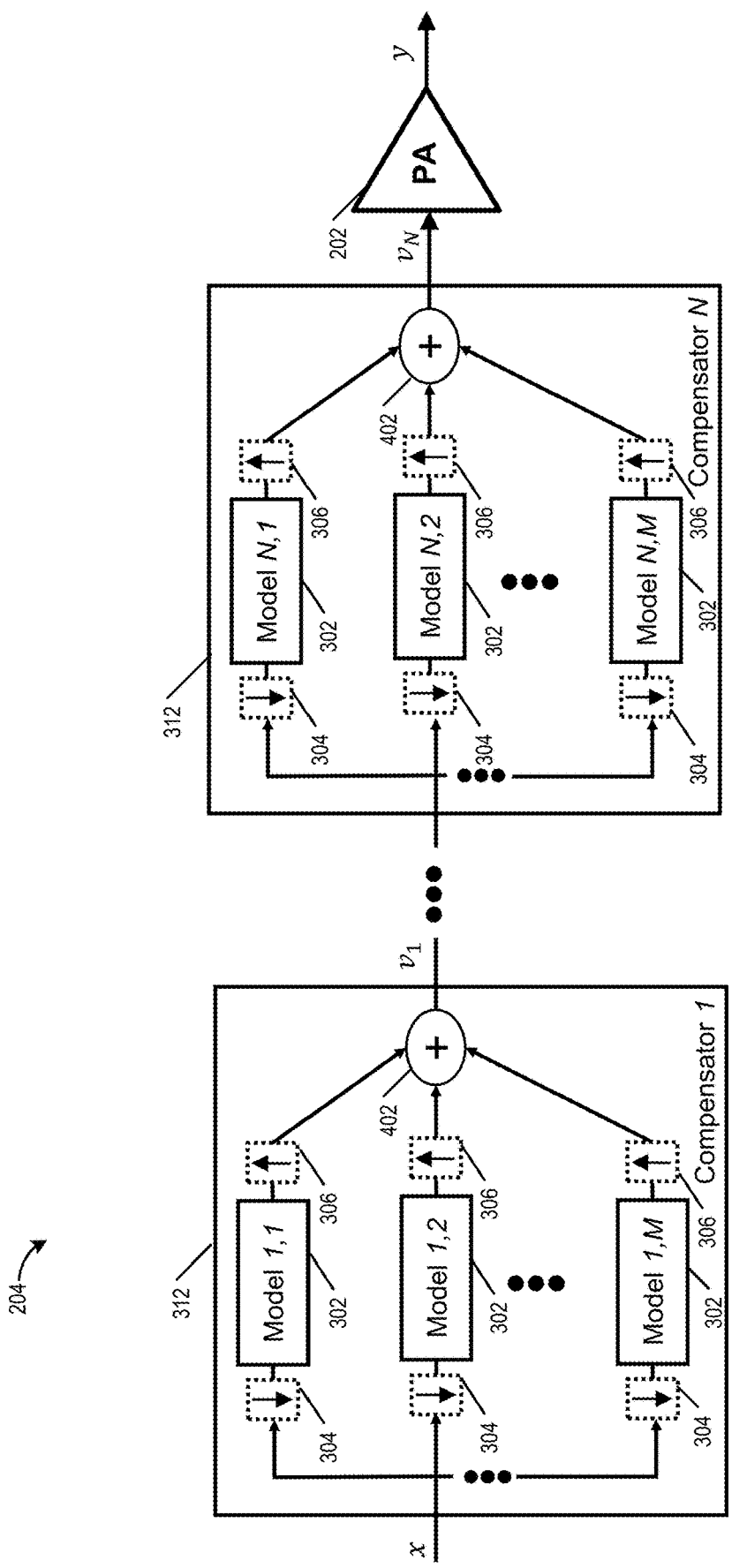
FIG. 4 illustrates another example implementation of a generalized digital compensator system in accordance with certain embodiments.

FIG. 4 illustrates another example implementation of a generalized digital compensator system 204 in accordance with certain embodiments. In the example illustrated in FIG. 4, the output of each set of models 302 of each compensator 312 may be provided to an adder or summation circuit 402. Thus, each compensator 312 may receive a single input signal and each model 302 within a compensator 312 may receive the same input. Moreover, as the sampling rates should match in order to combine the outputs of each model 302, the upsampling circuits 306 may be used to ensure that the outputs of each model 302 for a given compensator 312 have the same sampling rate.

As previously described, the digital predistortion adaptation system 206 may be used to configure the digital predistortion system 204 based at least in part on the output of the power amplifier 202 and the output of the crest factor reduction circuit 208. Configuring the digital predistortion system 204 may include setting the coefficients or weights of variables within the models 302 of the compensators 312 of the digital predistortion system 204.

In certain embodiments, the models 302 may be implemented using Volterra-based models. The modeling may start with a complex baseband representation of a real-valued Volterra series in accordance with the following equation:

$$f(u_1, \ldots, u_M) = \sum_{k=0}^{K}\sum_{m_1=0}^{M}\sum_{m_2=0}^{M} \ldots \sum_{m_{2k+1}=0}^{M} h_{2k+1}[m_1, m_2, \ldots, m_{2k+1}] \cdot \prod_{p=1}^{k+1} u[n-m_p] \cdot \prod_{q=k+2}^{2k+1} u^*[n-m_q]$$

The above equation may be truncated to a finite nonlinearity order 2K+1 and a memory depth M. A simplified and efficient version of the K-th order Volterra-based model may be given by the following equation:

$$f(u_1, \ldots, u_M) = \sum_{k=1}^{K}\sum_{p=0}^{M} h_{k,p} u[t+\tau_p]|u[t+\tau_p]|^{k-1} + \sum_{k=1}^{K-1}\sum_{p=0}^{M}\sum_{q=0}^{Q} h_{k,p,q} u[t+\tau_p]|u[t+\tau_p+\tau_q]|^k$$

Figure 5:
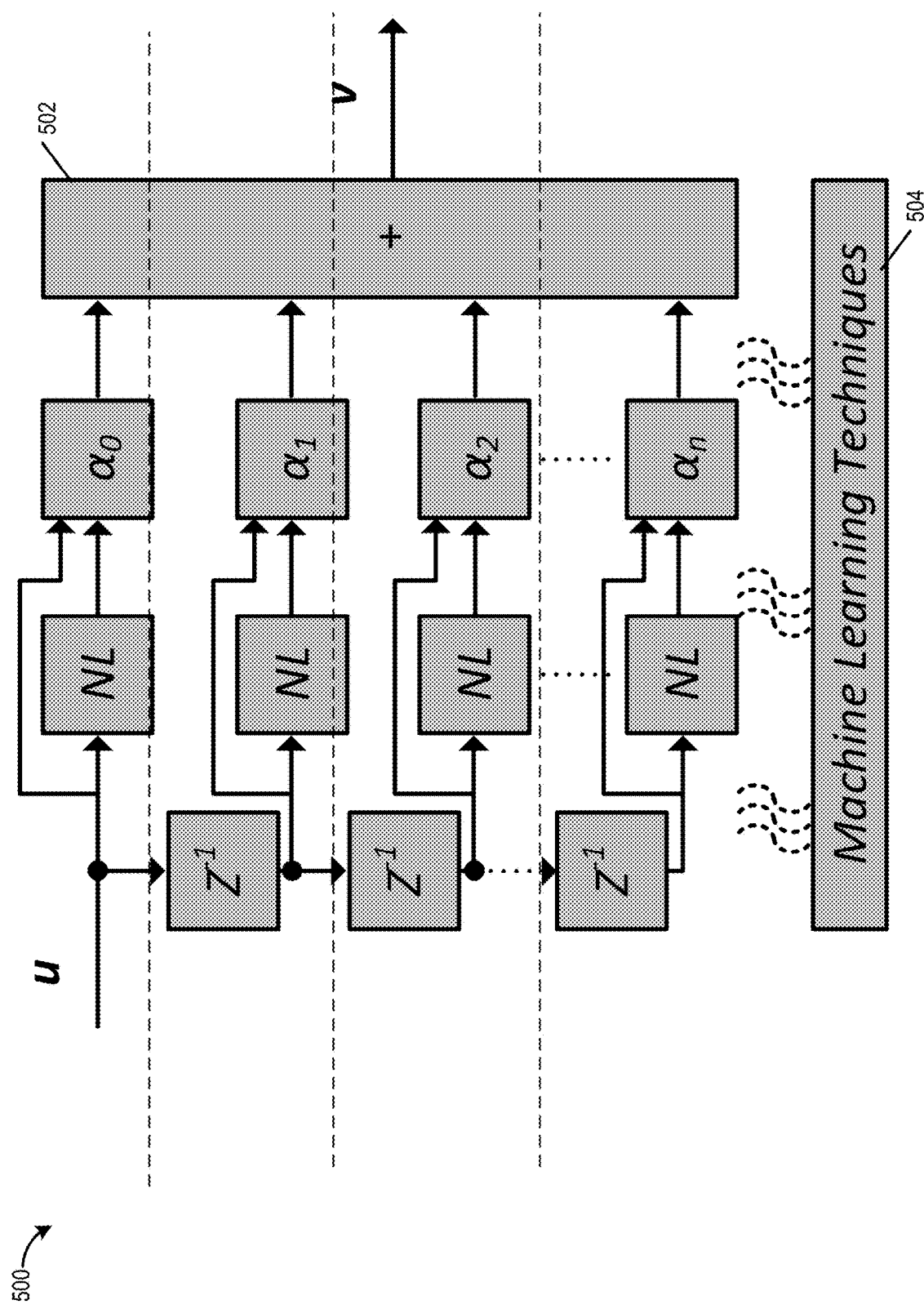
FIG. 5 illustrates an example block diagram of implementation of a model executed by a compensator of the generalized digital compensator system in accordance with certain embodiments.

The above equation may be known as a generalized memory polynomial (GMP) and may incorporate leading and lagging envelope terms. A model based on the above equation may be implemented as the model 302 of the compensator 312. FIG. 5 illustrates an example of the simplest form of a Volterra-based model block diagram in accordance with certain embodiments. The block diagram 500 implements the following:

$$f(u, \ldots, u_M) = \sum_{k=1}^{K}\sum_{p=0}^{M} h_{k,p} u[t+\tau_p]|u[t+\tau_p]|^{k-1}$$

As illustrated in FIG. 5, there are several signal paths. The horizontal dashed lines indicate separation between each neuron corresponding to the different signal paths within the model 302 represented by the block diagram 500. The block diagram 500 is a representation of an implementation of a memory polynomial where complex-valued u and real-valued |u| have the same time delay index $T_p$. In the definition of Generalized Memory Polynomial (GMP), the delay indices can differ. The output of each neuron may be added by the adder 502. The coefficients of the model represented by the α blocks may be configured using machine learning models as represented by the block 504. The determination of the coefficients for the neuron of the model 302 may be determined by the digital predistortion adaptation system 206 based at least in part on a feedback signal from the power amplifier 202 via the coupler 210.

Figure 6:
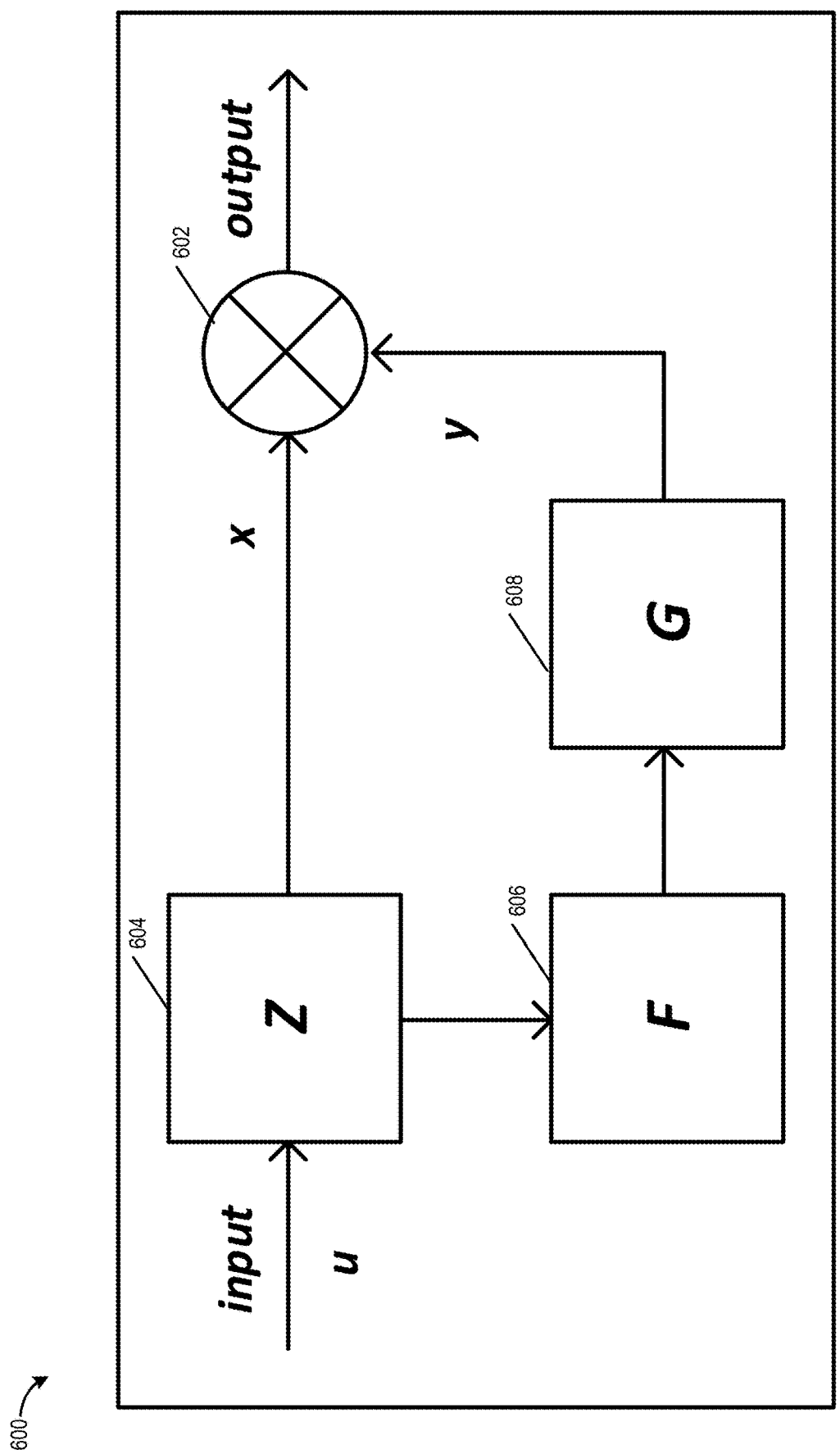
FIG. 6 illustrates an example block diagram of one neuron of a model executed by a compensator of the generalized digital compensator system in accordance with certain embodiments.

FIG. 6 illustrates an example block diagram of one neuron 600 of a model 302 executed by a compensator 312 of the generalized digital compensator system in accordance with certain embodiments. Each neuron 600 can implement a transformation or mathematical operation that can give rise to nonlinearities. The nonlinearities generated by the neurons 600 may be used to counter a nonlinearity of nonlinear elements, such as the power amplifier 202, of the transceiver radio 212 or wireless system 200, enabling the system to be linearized. The block diagram of FIG. 6 represents one neuron from the block diagram 500 representative of an implementation of a memory polynomial. This memory polynomial can be a GMP model, a Volterra-based model, or a variant thereof. Each neuron 600 may receive an input u, that may be supplied to the block Z 604. The block Z 604 may represent a complex operation that takes a complex input u and generates a complex output x. The block Z 604 can include any type of operation that can process a complex input u and generate a complex output x, which may be supplied to the block F 606 as well as the multiplier 602. For example, the block Z 604 may include addition, scalar multiplication, time shifting, time convolution, time differentiation, conjugation, moving average, complex multiplication, and the like.

Signals x and y cannot go through the same type of transformation in the neuron architecture (e.g., the neuron 600). Further, the transformation is or is mostly nonlinear. The multiplier 602 can be used to bring the nonlinear base frequencies into the passband frequencies of interest for the transceiver radio 212. The output of the block Z 604 may be supplied to the block F 606, which may perform a complex to real operation that converts the complex input to a real value. The block F 606 can include any type of operation that can derive a nonlinear envelope (or real-valued signal) from the complex-valued signal produced by the block Z 604.

After performing the complex to real operation at the block F 606, the neuron 600 provides the output of the block F 606 to block G 608, which may perform a real to complex operation converting the output of the block F 606 back to a complex value. The block G 608 can include any type of operation that can convert a real value to a complex value. For example, the block G 608 can implement a 1-D look up table (LUT), a multidimensional LUT, scalar multiplication, and the like. The operations performed by the block Z 604, block F 606, and block G 608 may vary based on the power amplifier 202. The selection of the operations may be determined using a machine learning algorithm executed by the digital predistortion adaptation system 206, which is configured to adapt or configure the digital predistortion system 204.

Figure 10:
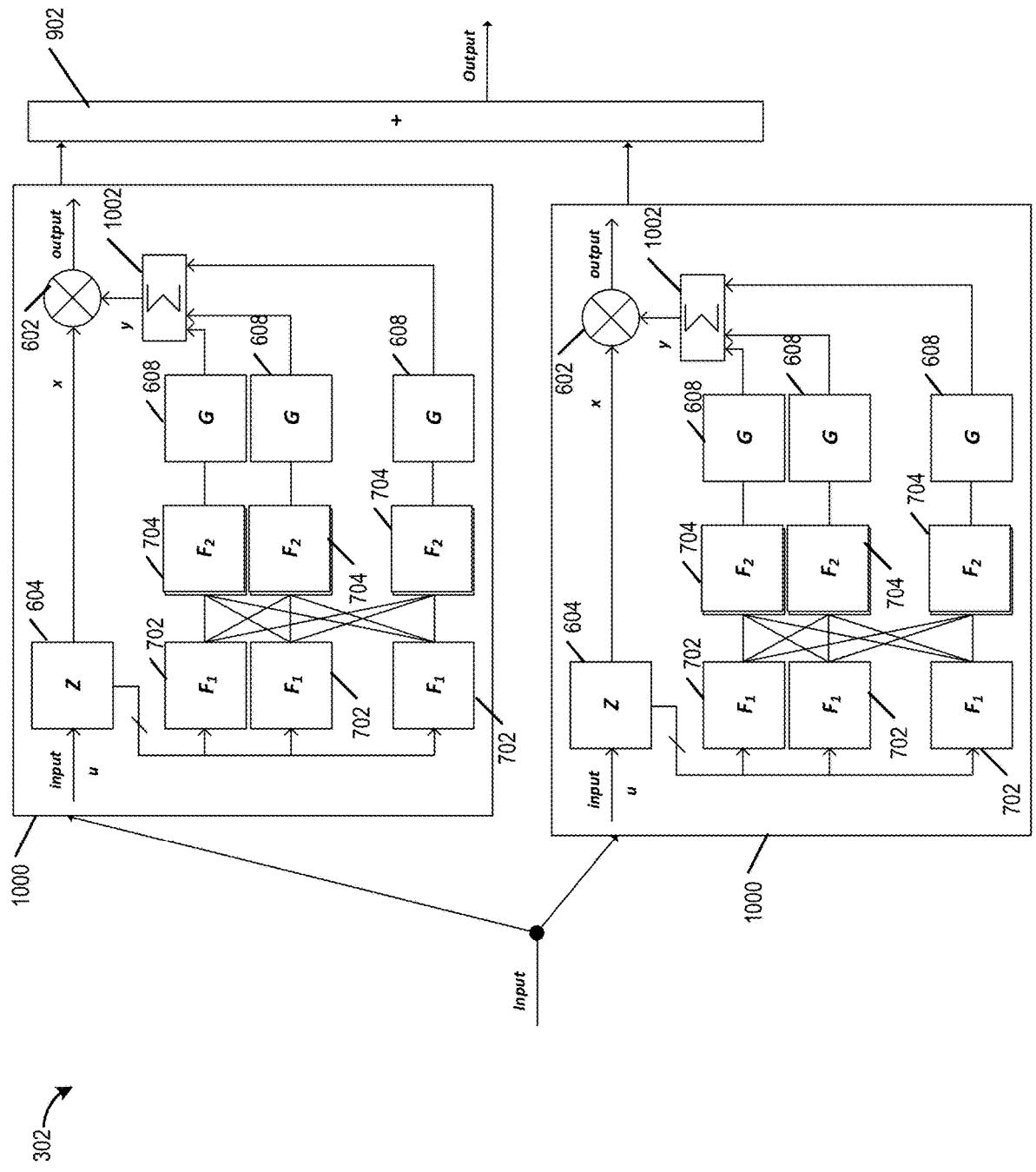
FIG. 10 illustrates a second example block diagram of a plurality of neurons of a model executed by a compensator of the generalized digital compensator system in accordance with certain embodiments.

The output y of block G 608 may be multiplied with the output x of the block Z 604 by the multiplier 602. The output of the multiplier 602 may be combined with outputs of other neurons by, for example, the adder 502 to produce an output of a compensator 312 included as part of the digital predistortion system 204. It is also possible to combine the signal y input to the multipliers 602 of a plurality of neurons prior to supplying the signal y to the multiplier 602. In other words, the signal y supplied to the multiplier 602 may be a combination of y signals from a plurality of neurons. By combining the y signals output from the block G 608 of multiple neurons prior to supplying the combined output y to the multiplier 602, efficiency of the system can be improved. The ability to combine the outputs y from several neurons prior to the multiplier 602 is illustrated in FIG. 10. Although not illustrated, it is also possible to combine a plurality of the signals x from multiple blocks Z 604 of multiple neurons prior to supplying the combined signal x to the multiplier 602.

The neuron 600 may be implemented as an application specific integrated circuit (ASIC) or as part of an ASIC that implements the digital predistortion system 204. Alternatively, the neuron 600 may be implemented using any type of circuitry or processor that may implement a digital predistortion system 204.

A Volterra-based model may be represented by the equation:

$$f(x) = \sum_{j,i} X_j \cdot Y_i$$

The X in the above equation may denote the complex-to-complex operation or transformation that may be performed by the block Z 604 and the Y may represent the complex-to-real operation or transformation that may be performed by the block F 606. Thus, a digital predistortion system that implements a Volterra-based model lend themselves to limited choices for block Z 604 and block F 606. Moreover, block G 608 may be shorted or otherwise removed from the neuron 600. Advantageously, embodiments of the present disclosure are more flexible enabling improved linearization of the wireless system 200 or transceiver radio 212 by increasing the flexibility of the digital predistortion system 204 to match he nonlinearity of the power amplifier 202.

Figure 7:
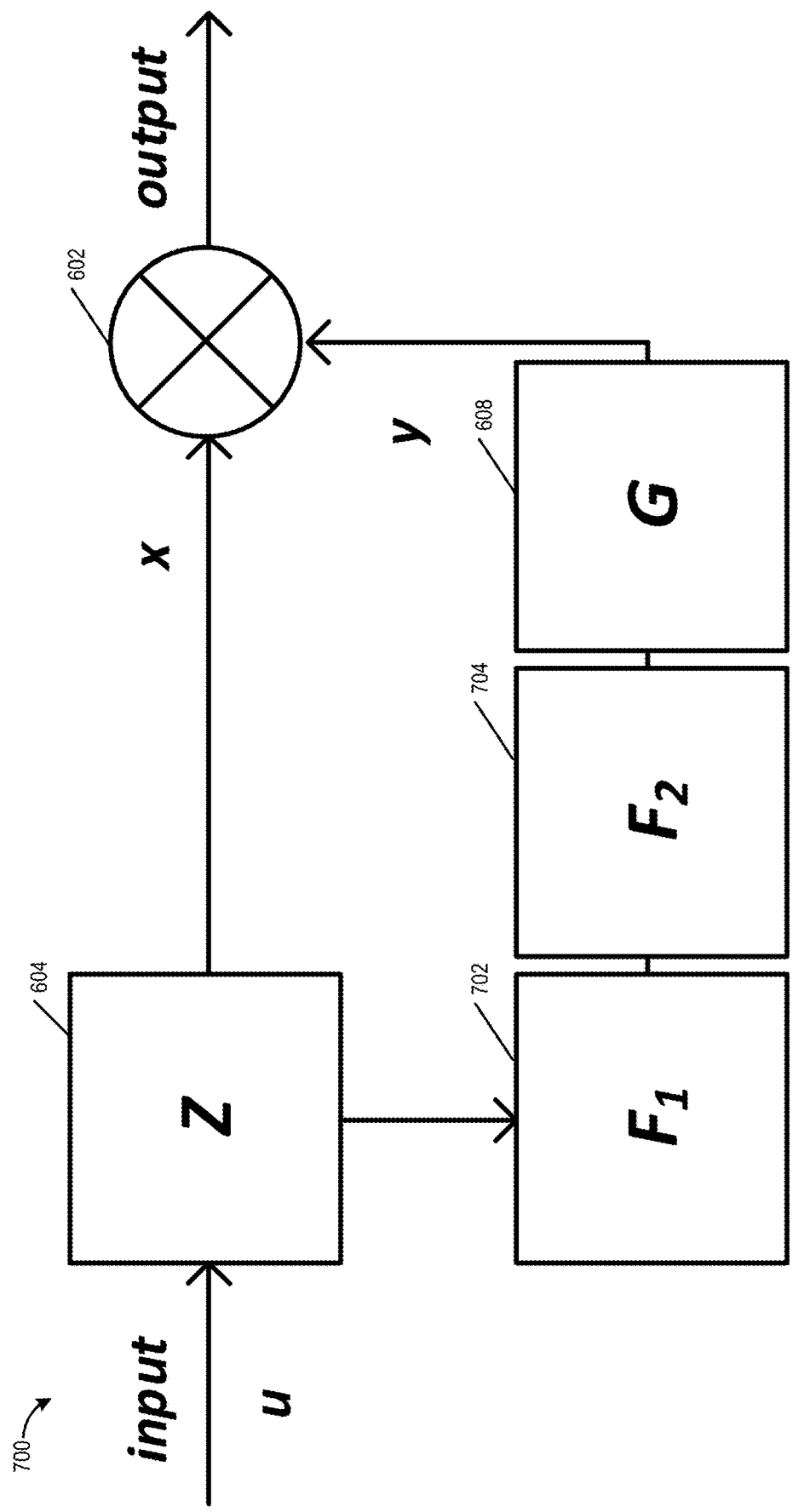
FIG. 7 illustrates a second example block diagram of one neuron of a model executed by a compensator of the generalized digital compensator system in accordance with certain embodiments.

FIG. 7 illustrates a second example block diagram of a neuron 700 of a model 302 executed by a compensator 312 of the generalized digital compensator system in accordance with certain embodiments. The one neuron 700 is similar to the neuron 600, but the block F 606 may be split into two operations F1 and F2 represented by block F1 702 and block F2 704. The block F1 702 may receive the output of the block Z 604 and perform a complex-to-real operation on the received signal. The block F1 702 may perform any type of complex-to-real operation including, for example, an absolute value function, an exponential function, a complex-real mapping function based on a real or imaginary part of the received signal, and the like. The output of the block F1 702 may be an intermediate signal that can be provided to the block F2 704, which may perform a real-to-real operation. Similarly, the outputs of the block Z 604 and the blocks F2 704 may be intermediate signals that are processed by subsequent blocks within the neuron 700. The block F2 704 may perform any type of real-to-real operation including, for example, scalar multiplication, time integration, a saturated rectifier function, a saturated hyperbolic tangent function, a Saleh model, scaling, multiplication, time shifting, time convolution, a moving average function, and the like. The combination of the operations associated with the block F1 702 and the block F2 704 may be equivalent to operations performable by the block F 606. Advantageously, implementing the models 302 using a set of neurons 700 improves the flexibility and efficiency of the 204 compared to traditional systems and compared to a system that uses only neurons 600.

Figure 8:
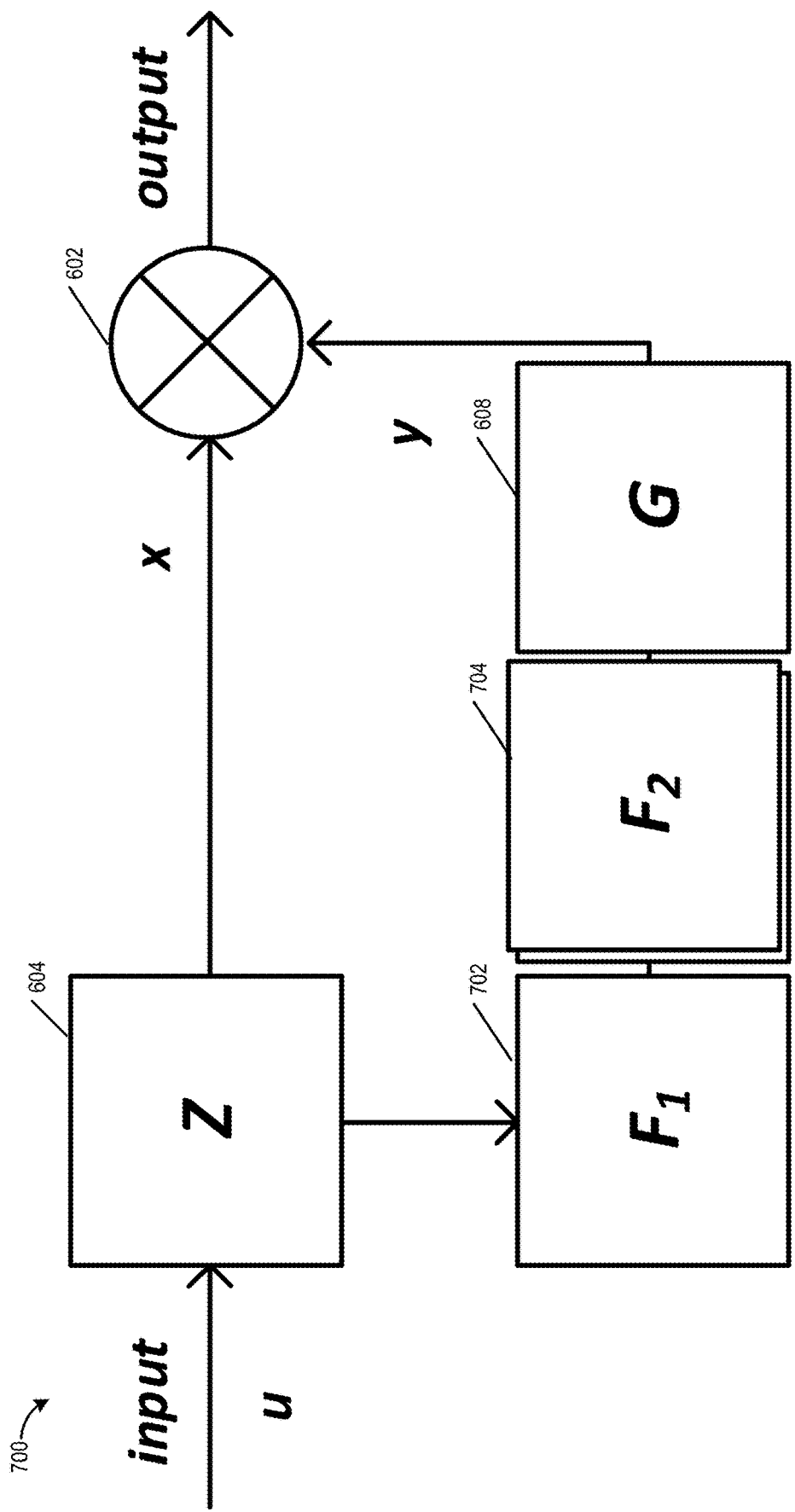
FIG. 8 illustrates a third example block diagram of one neuron of a model executed by a compensator of the generalized digital compensator system in accordance with certain embodiments.

FIG. 8 illustrates a third example block diagram of a neuron 800 of a model 302 executed by a compensator 312 of the generalized digital compensator system in accordance with certain embodiments. The neuron 800 is similar to the neuron 700, but as illustrated in FIG. 8, the neuron 800 may include a plurality of blocks F2 704 connected in parallel that may each process an output from the block F1 702 and supply the processed output of each of the blocks F2 704 to the block G 608. The outputs of the blocks F2 704 may be combined prior to being supplied to the block G 608. Alternatively, the outputs of each of the blocks F2 704 may be supplied separately to the block G 608.

Figure 9:
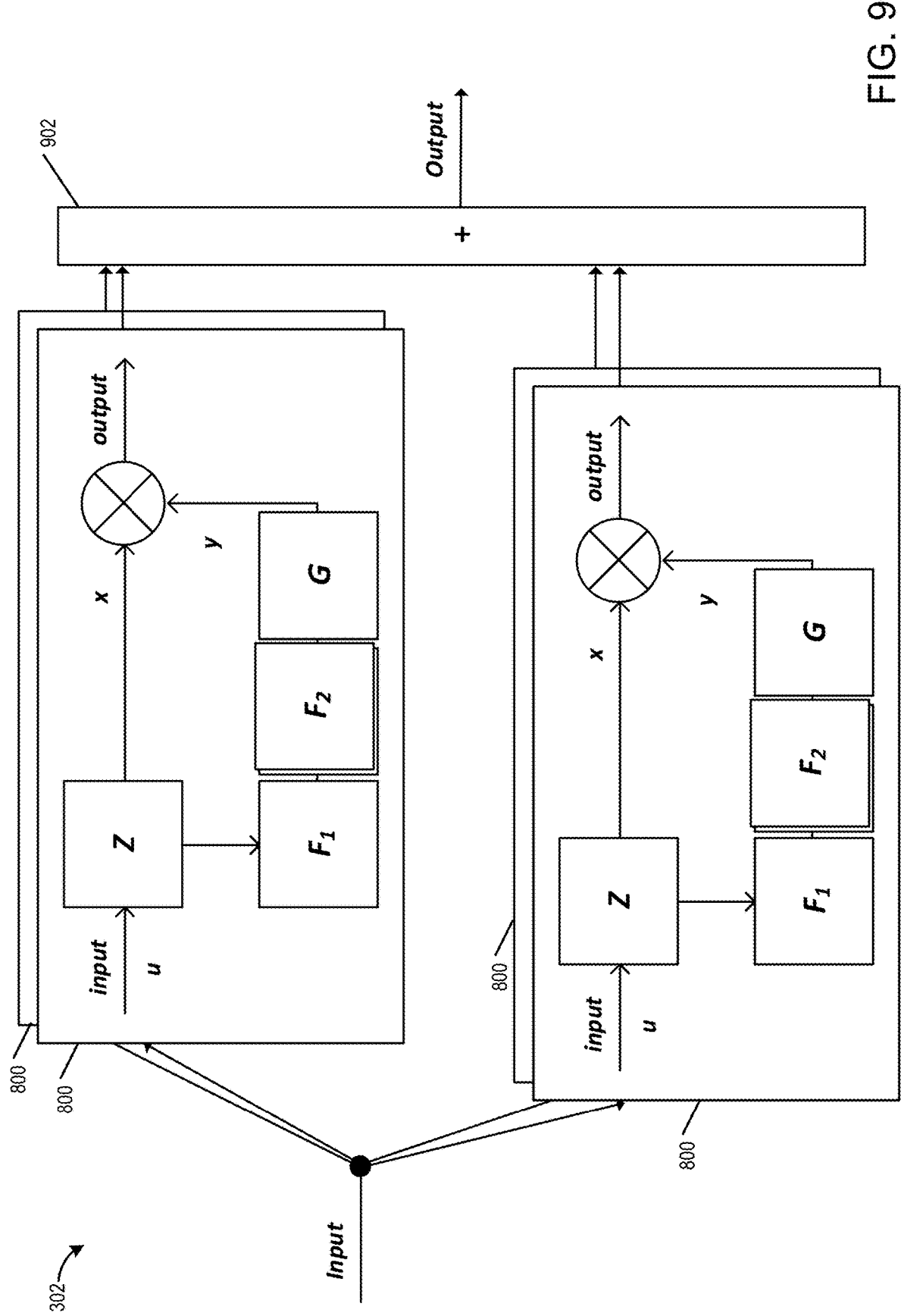
FIG. 9 illustrates an example block diagram of a plurality of neurons of a model executed by a compensator of the generalized digital compensator system in accordance with certain embodiments.

FIG. 9 illustrates an example block diagram of a plurality of neurons 800 of a model 302 executed by a compensator 312 of the generalized digital compensator system in accordance with certain embodiments. Each of the neurons 800 may receive an input signal. This input signal may be from the crest factor reduction circuit 208, such as when the neurons 800 are part of a first model 302 within a first compensator 312. Alternatively, the input signal may be received from other neurons within the first model 302 and/or from an output of a compensator 312 that is provided as an input to a subsequent compensator 312.

The output of each of the plurality of neurons 800 may be provided to an adder 902. The adder 902 can sum the outputs of each of the plurality of neurons 800 together to obtain a cumulative output that can be provided to a subsequent layer within a model 302 and/or to a subsequent model of a subsequent compensator 312. If the plurality of neurons 800 are part of the final layer in a final compensator 312, the output may be provided to the power amplifier 202 and/or other post-processing circuitry prior to being provided to the power amplifier 202. Each of the neurons 800 may correspond to a signal path within the block diagram 500. In such cases, the adder 902 may be the adder 502.

FIG. 10 illustrates a second example block diagram of a plurality of neurons 1000 of a model 302 executed by a compensator 312 of the generalized digital compensator system in accordance with certain embodiments. Advantageously, the implementation illustrated in FIG. 10 increases flexibility and efficiency of the compensator 312 of the digital predistortion system 204 while reducing circuit area and the number of coefficients by sharing portions of each neuron and cross connecting elements of each neuron. As illustrated, each of the plurality of neurons 1000 may themselves be a set of neurons implemented together to reduce circuitry by sharing an implementation of the block Z 604.

For each of the set of neurons 1000 illustrated in FIG. 10, the output of the block Z 604 may be supplied to a set of blocks F1 702. Each of the blocks F1 702 may implement a complex-to-real operation. However, at least some of the blocks F1 702 may implement different operations than at least some other blocks F1 702. The outputs of each of the blocks F1 may be provided to a plurality of blocks F2 704. Moreover, at least one block F1 702 may provide its calculated output to at least one block F2 704 associated with a different signal path or neuron than at least one other block F2 704. In other words, outputs of the blocks F1 702 may be distributed across different neurons enabling greater flexibility that can lead to improved accuracy in matching the nonlinearity of a power amplifier 202.

The output of the plurality of blocks F2 704 may be provided to the corresponding block G 608 for each neuron. The output of the blocks G 608 for subsets of the neurons 1000 may be provided to summation blocks or adders 1002. The outputs of the adders 1002 may provide the y signals that can be combined via the multipliers 602 with the x outputs of the block Z 604 to produce an output of the subsets of neurons 1000. The multipliers 602 may be used to bring the nonlinear baseband signal into the passband frequencies of interest for transmission by the transceiver radio 212. The outputs of each set of neurons 1000 may be combined via the adder 902 to produce an output for the model 302 or a layer of the model 302.

Any one of the blocks (e.g., block Z 604, block F 606, block F1 702, block F2 704, and/or block G 608) may include machine learnable parameters. The digital predistortion adaptation system 206 may use the output of the digital predistortion system 204 and the output of the power amplifier 202 to adjust the parameters of the blocks using one or more adaptive or machine learning algorithms. Examples of using adaptive algorithms to determine the parameters and/or coefficients of the neurons that constitute the models 302 of the power amplifier 202 are disclosed in U.S. application Ser. No. 18/332,323, previously incorporated by reference. In some embodiments, machine learning may be used to select not only the parameters of the models but may also be used to select one or more operations to be performed by each block of the neuron. In certain embodiments, the digital predistortion adaptation system 206 may select the operations for one or more of the block Z 604, block F 606, block F1 702, block F2 704, and/or block G 608 from a set of available operations (e.g., operations that may be stored in a memory accessible by the digital predistortion adaptation system 206).

In some cases, the set of available operations may be any type of operation that can stored in a memory of the wireless system 200 and/or processed by a general-purpose processor. However, in other embodiments, such as when the digital predistortion system 204 is implemented in application-specific hardware, the set of available operations may be limited to a particular set of operations that the digital predistortion system 204 is configured to execute. In such cases, the digital predistortion adaptation system 206 may select from the set of operations available to the digital predistortion system 204 for execution. Moreover, the digital predistortion adaptation system 206 may configured the digital predistortion system 204 to execute a default set of operations for one or more of the models 302. Over time, the digital predistortion adaptation system 206 may configured the digital predistortion system 204 to execute one or more different operations and/or may configured the operations to use one or more different coefficients based on a machine learning algorithm and/or an output of the power amplifier 202.

Each of the block Z 604, block F 606, block F1 702, block F2 704, and/or block G 608 may be or may be implemented by a set of processing circuit blocks. Each of the processing circuit blocks may be configured to execute one or more of the operations described herein. As described herein, these operations may comprise transformation functions that can transform a complex input signal into a complex intermediate signal and/or a real intermediate signal. The complex input signal may be an output of the crest factor reduction circuit 208 that corresponds to a signal to be transmitted by an antenna of the wireless system 200. The intermediate signals may then be transformed into an output signal or combined with a set of intermediate signals to generate an output signal that may be provided to subsequent models or as an input to the power amplifier 202.

Figure 11:
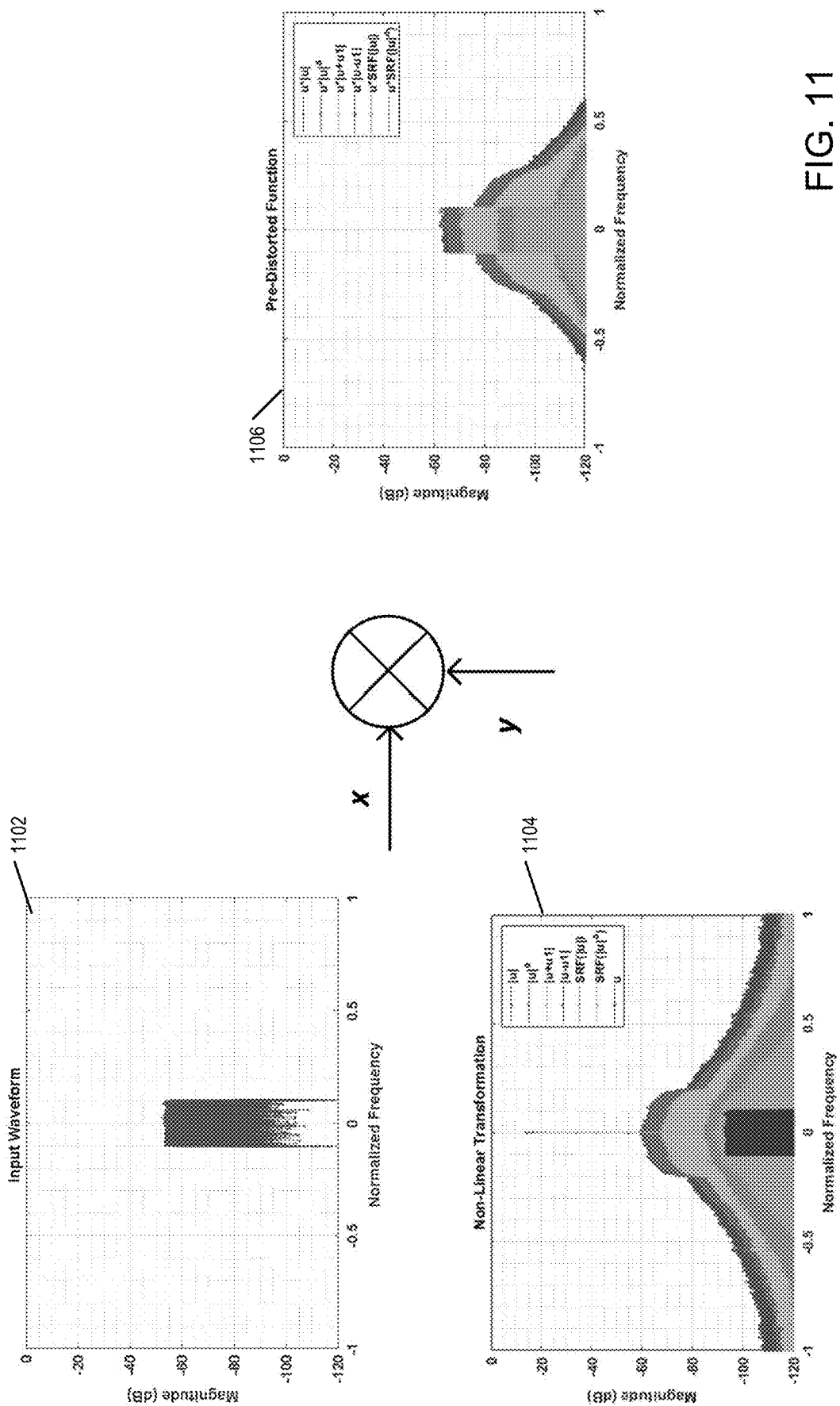
FIG. 11 illustrates an example of different transformations of nonlinearities that can be achieved by a neuron of a generalized digital compensator system using the enhanced models of the present disclosure in accordance with certain embodiments.

FIG. 11 illustrates an example of different nonlinearities that can be achieved by a neuron 1000 of a generalized digital compensator system using the enhanced models of the present disclosure in accordance with certain embodiments. FIG. 11 illustrates a non-transformed input signal 1102 applied to a plurality of different models 1104 that implement a plurality of different transformations using embodiments disclosed herein. Applying the different transformations using the models 1104, a set of corresponding pre-distorted functions 1106 can be obtained for the input signal 1102. Accordingly, the linearization engine 220 of the present disclosure can improve the efficiency and accuracy of the non-linearization process for linearizing the power amplifier 202.

Figure 12:
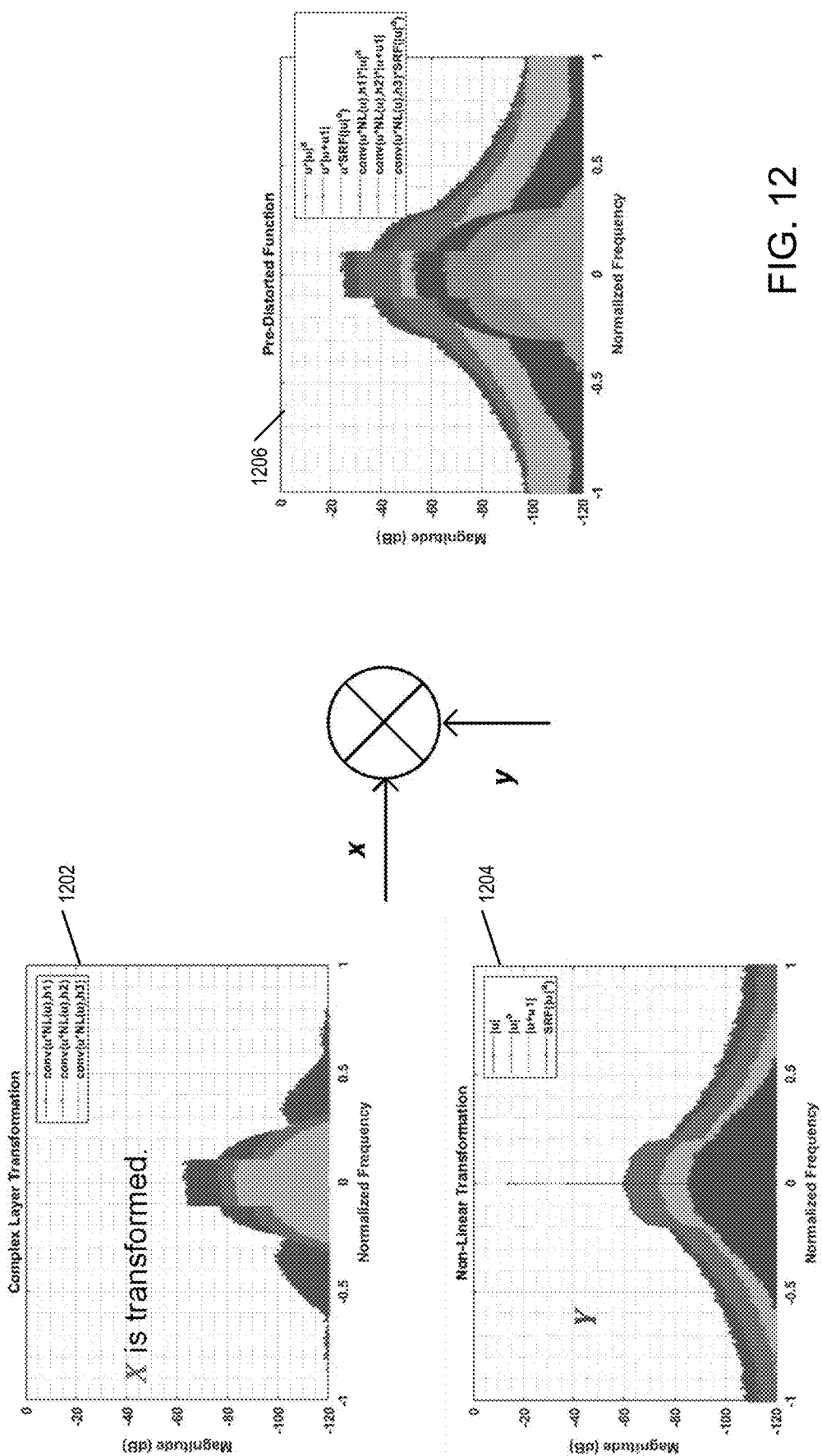
FIG. 12 illustrates a second example of different transformations of nonlinearities that can be achieved by a neuron of a generalized digital compensator system using the enhanced models of the present disclosure in accordance with certain embodiments.

FIG. 12 illustrates a second example of different transformations of nonlinearities that can be achieved by a neuron of a generalized digital compensator system using the enhanced models of the present disclosure in accordance with certain embodiments. FIG. 12, unlike FIG. 11, illustrates a transformed input signal 1202 applied to a plurality of different models 1204 that implement a plurality of different transformations using embodiments disclosed herein. The transformed input signals 1202 may be obtained from a prior neuron or model within the digital predistortion system 204, such as from a prior compensator 312 in a cascaded set of compensators 312. Applying the different transformations using the models 1204, a set of corresponding pre-distorted functions 1206 can be obtained for the input signal 1202. Accordingly, the linearization engine 220 of the present disclosure can improve the efficiency and accuracy of the non-linearization process for linearizing the power amplifier 202.

Figure 13:
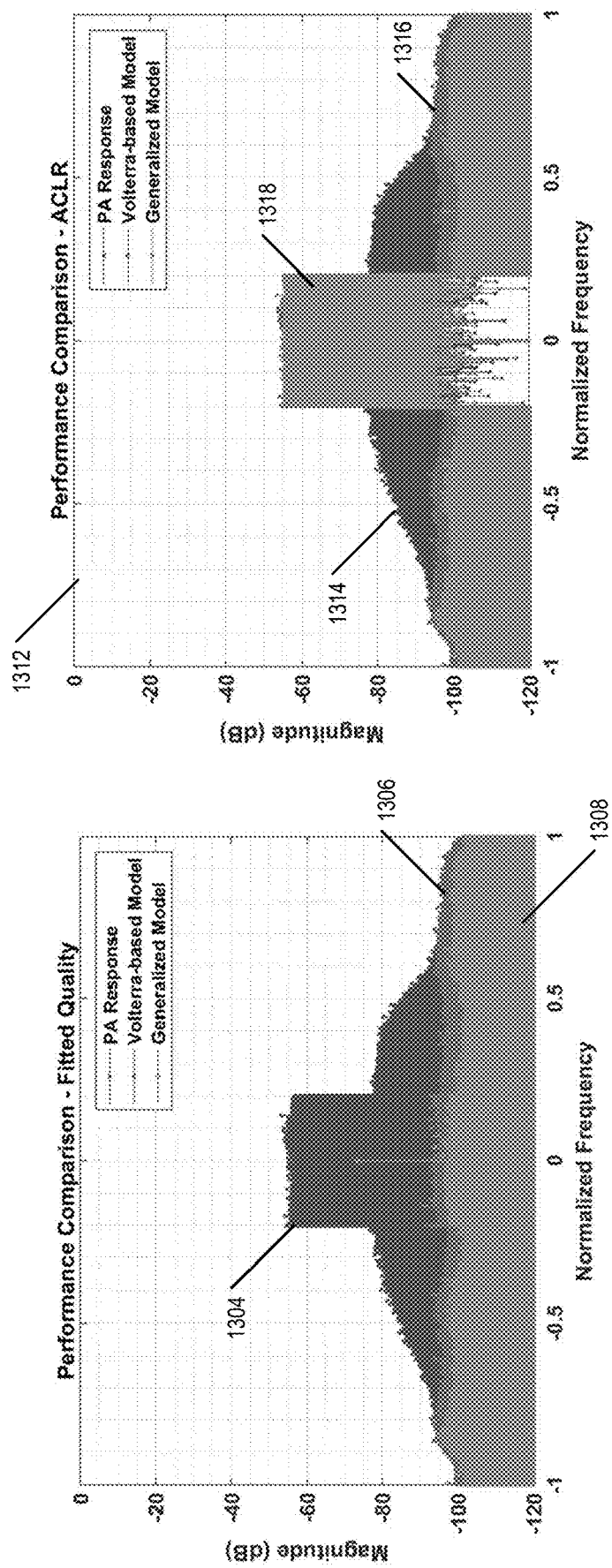
FIG. 13 illustrates simulation results comparing a Volterra-based model of a digital compensator and a generalized digital compensator of the present disclosure in accordance with certain embodiments.

FIG. 13 illustrates simulation results comparing a Volterra-based model of a digital compensator and a generalized digital compensator of the present disclosure in accordance with certain embodiments. The Volterra-based model in the simulation used 700 coefficients. In contrast, the generalized digital compensator of the present disclosure used 633 coefficients using the transformational building block disclosed herein (e.g., the blocks Z 604, the blocks F1 702, the blocks F2 704, and the blocks G 608). As the generalized digital compensator uses less coefficients, it is possible to implement the generalized digital compensator within a smaller area and using less power.

The graph 1302 of FIG. 13 compares the response 1304 of an example power amplifier to an output 1306 of the Volterra-based model and the output 1308 of the generalized digital compensator model. The fitted error between the response 1304 of the power amplifier and the output 1306 of the Volterra-based model was −33.4 dB or 2.13%. In contrast, the error between the response 1304 of the power amplifier and the output 1308 of the generalized digital compensator model was −37.1 dB or 1.4%. Thus, despite using less coefficients, the generalized digital compensator model was able to obtain a better fit for the power amplifier output than the Volterra-based model.

The graph 1312 of FIG. 13 compares the adjacent channel leakage ratio (ACLR) of the Volterra-based model and the generalized digital compensator model with respect to the response 1314 of the power amplifier. The output 1316 of the Volterra-based model corresponds to an ACLR of −41.2 dBc. In contrast, the output 1318 of the generalized digital compensator corresponds to an ACLR of −45.2 dBc. Thus, despite using less coefficients, the generalized digital compensator model was able to obtain a better ACLR with respect to the power amplifier output than the Volterra-based model.

Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations, including being performed at least partially in parallel. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be construed in an inclusive sense as opposed to an exclusive or exhaustive sense, that may be to say, in the sense of "including, but not limited to".

What is claimed is:

1. A digital predistortion system configured to distort a power amplifier input signal prior to being input to a power amplifier, the digital predistortion system comprising:
   a compensator comprising a plurality of processing circuit blocks, wherein each processing circuit block of the plurality of processing circuit blocks is configured to implement a transformation function to modify a characteristic of an input signal that is input to the compensator, wherein the transformation function is implemented as a set of neurons, and wherein each neuron of the set of neurons comprises:
      a first processor configured to execute a first operation that transforms a complex input signal to a first complex intermediate signal;
      a second processor configured to execute a second operation that transforms the first complex intermediate signal to a real intermediate signal;
      a third processor configured to execute a third operation that transforms the real intermediate signal to a second complex intermediate signal;
      a multiplier that combines the first complex intermediate signal and the second complex intermediate signal to obtain an output signal; and
      a fourth processor between the second processor and the third processor, the fourth processor configured to execute a fourth operation that transforms the real intermediate signal to a modified real intermediate signal, and wherein the third operation transforms the real intermediate signal by transforming the modified real intermediate signal to the second complex intermediate signal,
   wherein each processing circuit block comprises an adder configured to combine the output signal of each neuron from the set of neurons to generate an output of the transformation function.

2. The digital predistortion system of claim 1, wherein each processing circuit block of the plurality of processing circuit blocks is connected in parallel within the compensator.

3. The digital predistortion system of claim 1, wherein, for each neuron of the set of neurons, at least two of the first processor, the second processor, and the third processor of each neuron may be implemented by a single hardware processor.

4. The digital predistortion system of claim 1, wherein at least one neuron from the set of neurons comprises a plurality of fourth processors cascaded and configured to execute a plurality of fourth operations on the real intermediate signal.

5. The digital predistortion system of claim 1, wherein the real intermediate signal of at least one neuron of the set of neurons is distributed to the fourth processor of a plurality of neurons of the set of neurons.

6. The digital predistortion system of claim 1, wherein at least one of the first operation, the second operation, or the third operation comprise learnable parameters determined by performing a machine learning process.

7. The digital predistortion system of claim 1, wherein the set of neurons form a neural network.

8. The digital predistortion system of claim 1, wherein at least one of the first operation, the second operation, or the third operation are selected from a set of available operations using a machine learning process.

9. The digital predistortion system of claim 1, further comprising:
a second compensator connected in series with the compensator, the second compensator comprising a second plurality of processing circuit blocks; and
a second adder configured to:
sum an output of each processing circuit of the second plurality of processing circuit blocks to obtain a digital predistortion signal; and
provide the digital predistortion signal as an input to the power amplifier, wherein the power amplifier is connected in series with the digital predistortion system.

10. The digital predistortion system of claim 9, wherein a combination of at least the compensator and the second compensator are configured to generate a distortion of a power amplifier input signal such that a total system response of a system that includes the power amplifier is linear.

11. The digital predistortion system of claim 1, wherein at least one processing circuit block of the plurality of processing circuit blocks implements a different transformation function than at least one other processing circuit block of the plurality of processing circuit blocks.

12. A transceiver radio comprising:
a power amplifier; and
a digital predistortion system connected in series with the power amplifier, the digital predistortion system comprising:
a compensator comprising a plurality of processing circuit blocks, wherein each processing circuit block of the plurality of processing circuit blocks is configured to implement a transformation function to modify a characteristic of an input signal that is input to the compensator, wherein the transformation function is implemented as a set of neurons, and wherein each neuron of the set of neurons comprises:
a first processor configured to execute a first operation that transforms a complex input signal to a first complex intermediate signal;
a second processor configured to execute a second operation that transforms the first complex intermediate signal to a real intermediate signal;
a third processor configured to execute a third operation that transforms the real intermediate signal to a second complex intermediate signal; and
a multiplier that combines the first complex intermediate signal and the second complex intermediate signal to obtain an output signal,
wherein each processing circuit block comprises an adder configured to combine the output signal of each neuron from the set of neurons to generate an output of the transformation function;
a second compensator connected in series with the compensator, the second compensator comprising a second plurality of processing circuit blocks; and
a second adder configured to:
sum an output of each processing circuit of the second plurality of processing circuit blocks to obtain a digital predistortion signal; and
provide the digital predistortion signal as an input to the power amplifier, wherein the power amplifier is connected in series with the digital predistortion system.

13. The transceiver radio of claim 12, further comprising a crest factor reduction circuit configured to receive a transmit signal and to reduce a peak-to-average power ratio of the transmit signal to obtain a reduced peak-to-average power ratio transmit signal, wherein the reduced peak-to-average power ratio transmit signal is provided as the input signal to the digital predistortion system.

14. The transceiver radio of claim 12, further comprising a digital predistortion adaptation circuit configured to receive an output of the power amplifier and to configure one or more coefficients of at least one of the first operation, the second operation, or the third operation based at least in part on applying the output of the power amplifier to a machine learning model.

15. The transceiver radio of claim 12, wherein each neuron of the set of neurons further comprises a fourth processor between the second processor and the third processor, the fourth processor configured to execute a fourth operation that transforms the real intermediate signal to a modified real intermediate signal, and wherein the third operation transforms the real intermediate signal by transforming the modified real intermediate signal to the second complex intermediate signal.

16. The transceiver radio of claim 15, wherein the real intermediate signal of at least one neuron of the set of neurons is distributed to the fourth processor of a plurality of neurons of the set of neurons.

17. The transceiver radio of claim 12, wherein a combination of at least the compensator and the second compensator are configured to generate a distortion of a power amplifier input signal such that a total system response of a system that includes the power amplifier is linear.

18. A wireless device comprising:
an antenna configured to emit a signal received from a power amplifier;
the power amplifier; and
a transceiver radio comprising a digital predistortion system in connected series with the power amplifier, the digital predistortion system comprising:
a compensator comprising a plurality of processing circuit blocks, wherein each processing circuit block of the plurality of processing circuit blocks is configured to implement a transformation function to modify a characteristic of an input signal that is input to the compensator, wherein the transformation function is implemented as a set of neurons, and wherein each neuron of the set of neurons comprises:
a first processor configured to execute a first operation that transforms a complex input signal to a first complex intermediate signal;
a second processor configured to execute a second operation that transforms the first complex intermediate signal to a real intermediate signal;
a third processor configured to execute a third operation that transforms the real intermediate signal to a second complex intermediate signal;
a multiplier that combines the first complex intermediate signal and the second complex intermediate signal to obtain an output signal; and
a fourth processor between the second processor and the third processor, the fourth processor configured to execute a fourth operation that transforms the real intermediate signal to a modified real intermediate signal, and wherein the third operation transforms the real intermediate signal by transforming the modified real intermediate signal to the second complex intermediate signal,
wherein each processing circuit block comprises an adder configured to combine the output signal of each neuron from the set of neurons to generate an output of the transformation function.

19. The wireless device of claim 18, wherein the digital predistortion system further comprises:
a second compensator connected in series with the compensator, the second compensator comprising a second plurality of processing circuit blocks; and
a second adder configured to:
sum an output of each processing circuit of the second plurality of processing circuit blocks to obtain a digital predistortion signal; and
provide the digital predistortion signal as an input to the power amplifier, wherein the power amplifier is connected in series with the digital predistortion system.

20. The wireless device of claim 19, wherein a combination of at least the compensator and the second compensator are configured to generate a distortion of a power amplifier input signal such that a total system response of a system that includes the power amplifier is linear.

* * * * *